United States Patent

Matsen et al.

(10) Patent No.: US 8,965,994 B2
(45) Date of Patent: Feb. 24, 2015

(54) APPROACH FOR AUTOMATICALLY SETTING THE DEVICE INSTANCE OF A BACNET DEVICE

(75) Inventors: Dean C. Matsen, Shoreline, WA (US); Michael Underhill, Bothell, WA (US)

(73) Assignee: Honeywell International Inc., Morristown, NJ (US)

( * ) Notice: Subject to any disclaimer, the term of this patent is extended or adjusted under 35 U.S.C. 154(b) by 1195 days.

(21) Appl. No.: 12/435,993

(22) Filed: May 5, 2009

(65) Prior Publication Data

US 2010/0286799 A1      Nov. 11, 2010

(51) Int. Cl.
*G06F 15/16*      (2006.01)
*H04L 29/08*      (2006.01)
*H04L 29/12*      (2006.01)

(52) U.S. Cl.
CPC ......... *H04L 67/125* (2013.01); *H04L 29/12254* (2013.01); *H04L 61/2038* (2013.01)
USPC ........... 709/208; 709/203; 709/223; 709/224; 709/227; 709/246; 370/315; 700/90

(58) Field of Classification Search
USPC .......... 709/203, 223, 224, 227, 246; 370/315; 700/90
See application file for complete search history.

(56) References Cited

U.S. PATENT DOCUMENTS

| | | | |
|---|---|---|---|
| 2009/0271001 A1* | 10/2009 | Westphal et al. | 700/3 |
| 2009/0287736 A1* | 11/2009 | Shike et al. | 707/103 R |
| 2010/0142535 A1* | 6/2010 | Swainston | 370/395.3 |

OTHER PUBLICATIONS

Alerton Press Release, "New Features, Ehancements to Alerton's Envision for Bactalk v2.0 System Save Time, Improve Productivity, and Support Legacy Equipment," 1 page, printed Apr. 29, 2009.
Alerton, "Envision for Bactalk," 2 pages, prior to May 5, 2009.
Alerton, "Envision for Bactalk, Bacnet Protocol Implementation Conformance Statement," 3 pages, Jan. 13, 2005.
Hi Solutions, Field Commander Universal Unitary Controller, Product Brief, 2 pages, prior to May 5, 2009.
Metasys Unitary Controller (UNT), Metasys Network Sales Manual, 8 pages, Feb. 1995.
Swan, "Internetworking withBACnet, a First Look at Networking in BACnet," 10 pages, printed Apr. 28, 2009.

\* cited by examiner

*Primary Examiner* — Hitesh Patel
(74) *Attorney, Agent, or Firm* — Seager Tufte & Wickhem LLC.

(57) ABSTRACT

An approach for automatically setting the device instance of a device such as a unitary controller without reliance on a router and/or global controller, or something like a special extension to an associated router and/or global controller. The approach may be implementable entirely by logic in the unitary controller.

20 Claims, 1 Drawing Sheet

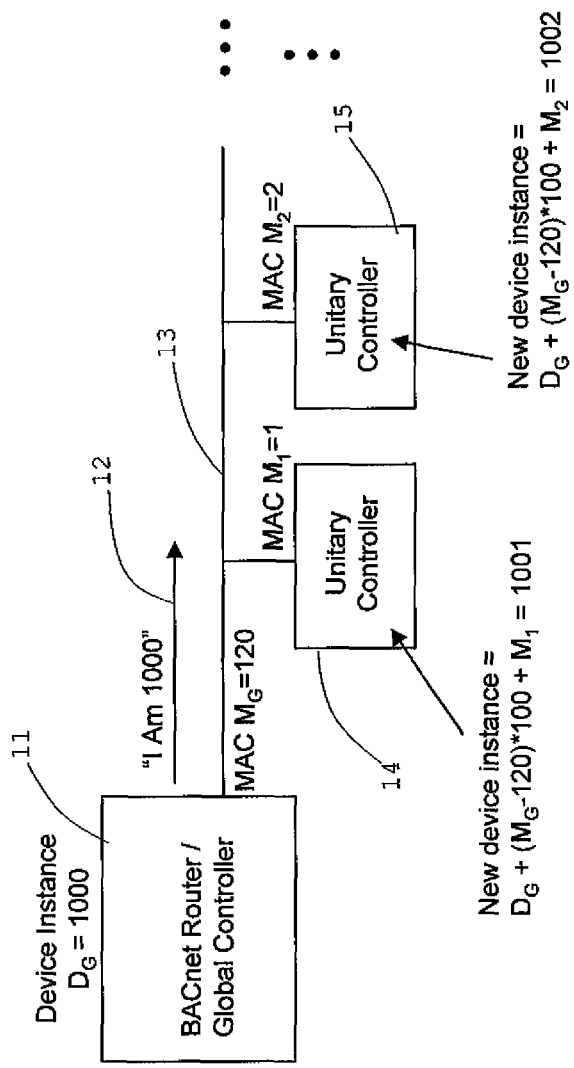

APPROACH FOR AUTOMATICALLY SETTING THE DEVICE INSTANCE OF A BACNET DEVICE

BACKGROUND

The invention pertains to network devices and particularly to BACnet devices.

SUMMARY

The invention is an approach for automatically setting the device instance of a device such as a unitary controller without reliance on a router and/or global controller or something such as a special extension to an associated router and/or global controller. The approach may be implementable entirely in the unitary controller.

BRIEF DESCRIPTION OF THE DRAWING

FIG. 1 is a diagram of a layout for setting an instance of a BACnet device.

DESCRIPTION

It may take an installer some time to manually set the device instance on a BACnet (building automation and control network) device. In some cases, a special tool may be required to do the device instance. The present approach indicates how the device can automatically choose a reasonable device instance. BACnet is a non-proprietary open protocol communication protocol and system developed by the American Society of Heating Refrigeration Air-Conditioning Engineers (ASHRAE) and adopted by the American National Standards Institute (ANSI) as an ANSI/ASHRAE Standard 135-1995.

For BACnet unitary controllers (unitaries) on MS/TP (master-slave/token-passing) networks, there is often a BACnet router from an Ethernet to that MS/TP network. The Ethernet and the MS/TP network may be regarded as BACnet LANs (local-area networks). The router device instance may be used as a basis for the other devices on that MS/TP network. For example, if the router has a device instance of 10000, the unitary controllers may automatically determine their device instances to be 10001, 10002, 10003, and so on. This computation may be based on an MAC (media access control) address of the MS/TP device, which is unique on that MS/TP network.

Two versions of the present approach are noted. The first version is suitable for system designs where BACnet routers may have just one MS/TP network. The second version accounts for routers that may have multiple MS/TP networks.

A benefit of the present approach is that it can be used entirely without any special BACnet extensions to the router/global controller (global) itself. The global controller may generally include a router. The present approach may be implemented entirely in the unitary controller. What is needed is for the unitary controller to implement an algorithm indicated herein.

As noted, the present approach is for automatically addressing unitaries. A goal of the first version may be that unitary controllers reconfigure their device instances to be equal to (global controller device instance)+(unitary MAC address). This scheme differs from other approaches in that virtually all of the logic for doing the auto-addressing is in the unitary rather than in the global controller and/or router.

A goal of the second version is that unitary controllers reconfigure their device instances to be equal to (global controller device instance)+(global controller MAC address−120)*100+(unitary MAC address). The "100" may be regarded as spacing among the global controllers so that there is "room" for unitary controller device instances.

FIG. 1 is a diagram of the present approach for setting an instance of a BACnet device. A BACnet router and/or global controller 11 may have a device instance, $D_G$=1000. Router or controller 11 may provide an "I Am" message which indicates "I am 1000" on a line 12. Router or controller 11 may provide on a line or LAN 13 an indication "MAC $M_G$=120". LAN or line 13 may be an MS/TP network. A unitary controller 14, which is connected to line 13, may have "MAC $M_1$=1", and a unitary controller 15, which also is connected to line 13, may have "MAC $M_2$=2". Other unitary controllers may be connected to line 13. A new device instance for unitary controller 14 may equal "$D_G$+($M_G$−120)*100+$M_1$=1001". The new device instance for unitary controller 15 may equal "$D_G$+($M_G$−120)*100+$M_2$=1002". Other new device instances, which follow in the same manner, may equal 1003, 1004 . . . 1000+n, where n is a total number of unitary controllers on line or network 13.

The network needs to be configured as in the following. First, global controllers that are to support auto-addressing should have, for example, an MS/TP MAC address in the range 120-127. The unitaries may look for an "I-Am" message from MAC address 120-127 to determine what their own device instances should be. Not having any device with an MS/TP MAC address in the range 120-127 effectively disables the feature for that MS/TP network.

Second, unitary controllers that support this feature will not communicate if they have a MAC address in the range 120-127. Having a MAC address in the range 120-127 effectively disables the device's MS/TP. This should prevent an auto-addressing device from scrambling the others' device instances. In either case, MAC addresses for the unitaries may be limited to the range 1 . . . 119 and the MAC addresses for the globals may be limited to the range 120 . . . 127. The MAC address 0 cannot be used for anything because it results in no offset from the global. Other numbers or ranges of numbers may be used in MAC addresses for the unitaries and the globals.

Third, global controllers must be addressed such that there is "room" for the unitary device instances. This means that the globals could be addressed 100, 200, 300, and so on, and support up to 99 unitaries. Technically, the globals could be spaced at 200, 400, 600, and so on, and support up to 127 unitaries. In many practical situations, the spacing may range from 50 to 300. Since it is recommended not to go over 80 unitaries per MS/TP, spacing globals in intervals of 100 should be fine.

Some engineers may prefer to prefix the unitary device instance with the global device instance. For example, device 100 may be the router to unitaries 100001, 100002, 100003, and so on. One can get a very similar result by addressing globals with instances 100000, 200000, and so on. The only difference here is that the globals have large numbers rather than the smaller numbers in the 100's.

Global controllers with multiple MS/TP networks need to be configured such that a global controller has a different MAC address on each of the MS/TP networks. This separates the ranges of the devices.

The approach may work as noted in the following. Auto addressing may occur when a unitary listens to an "I-Am" message coming from a global controller. When the global controller emits a device instance that is different from what the unitary has stored in flash, the unitary may update its own copy and re-address itself. In systems with such devices, auto-addressing may be forced by doing anything that causes the global to emit an "I-Am" message.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A device instance setting mechanism comprising:
    a building and automation control network;
    a global controller connected to the network, wherein the global controller has a global controller identifier; and
    at least one unitary controller connected to the network, wherein each of the at least one unitary controllers includes a unique device instance; and
    wherein each of the at least one unitary controllers receive the global controller identifier via the network, and automatically generate the unique device instance of the corresponding at least one unitary controller based, at least in part, on the global controller identifier.

2. The mechanism of claim 1, wherein the network is a BACnet master-slave/token-passing network.

3. The mechanism of claim 2, wherein the global controller comprises a router.

4. The mechanism of claim 3, wherein the global controller has one master-slave/token-passing network.

5. The mechanism of claim 1, wherein the global control identifier includes a global controller device instance, and the unique device instance of each of the at least one unitary controllers includes the global controller device instance plus a media access control address of the corresponding one of the at least one unitary controllers.

6. The mechanism of claim 3, wherein the global controller has two or more master-slave/token-passing networks.

7. The mechanism of claim 5, wherein the device instance of each of the at least one unitary controllers is set equal to: (the global controller device instance)+(a global controller media access control address minus a constant)*(a number representing an inter-global controller spacing)+(the media access control address of the corresponding one of the at least one unitary controllers).

8. The mechanism of claim 7, wherein the number representing the inter-global controller spacing ranges from 50 to 300.

9. A method for setting a device instance, comprising:
    providing a global controller on a building and automation control network, wherein the global controller has a global controller identifier;
    providing at least one unitary controller on the network, wherein each of the at least one unitary controllers includes a unique device instance;
    receiving the global controller identifier at each of the at least one unitary controllers;
    each of the at least one unitary controllers automatically generating its unique device instance based, at least in part, on the global controller identifier; and
    each of the at least one unitary controllers setting its corresponding device instance to the automatically generated device instance.

10. The method of claim 9, wherein the network is a BACnet master-slave/token-passing network.

11. The method of claim 10, wherein the global controller has two or more master-slave/token-passing networks.

12. The method of claim 9, wherein the global control identifier includes a global controller device instance, and wherein the device instance of each of the at least one unitary controllers is set equal to: (the global controller device instance)+(a global controller media access control address minus a first constant)*(a second constant)+(a unitary media access control address of the corresponding one of the at least one unitary controllers).

13. The method of claim 9, wherein the global controller comprises a router.

14. The method of claim 12, wherein the second constant is a number representing an inter-global controller spacing.

15. The method of claim 9, wherein the global controller has one master-slave/token-passing network.

16. The method of claim 9, wherein the global control identifier includes a global controller device instance, and wherein the unique device instance of each of the at least one unitary controllers includes the global controller device instance and a media access control address of the corresponding one of the at least one unitary controllers.

17. A setting system comprising:
    a global controller connected to a network, wherein the global controller has a global controller identifier; and
    at least one unitary controller connected to the network, wherein each of the at least one unitary controllers includes a unique device instance; and
    wherein each of the at least one unitary controllers receives the global controller identifier, and automatically generates the unique device instance of the corresponding at least one unitary controller based, at least in part, on the global controller identifier.

18. The setting system of claim 17, wherein the at least one unitary controller comprises logic for auto-addressing the at least one unitary controller.

19. The setting system of claim 17, wherein the global control identifier includes a global controller device instance, and wherein each of the at least one unitary controllers reconfigures its device instance to include the global controller device instance and a unitary controller media access control address of the corresponding one of the at least one unitary controllers.

20. The setting system of claim 19, wherein:
    the device instance of each of the at least one unitary controllers includes the global controller device instance, a global controller media access control address multiplied by a constant, and the unitary controller media access control address of the corresponding one of the at least one unitary controllers; and
    the constant is a number representing an inter-global controller spacing.

* * * * *